Sept. 16, 1958  E. FERMI ET AL  2,852,461
NEUTRONIC REACTOR
Filed Oct. 11, 1945
FIG.1.
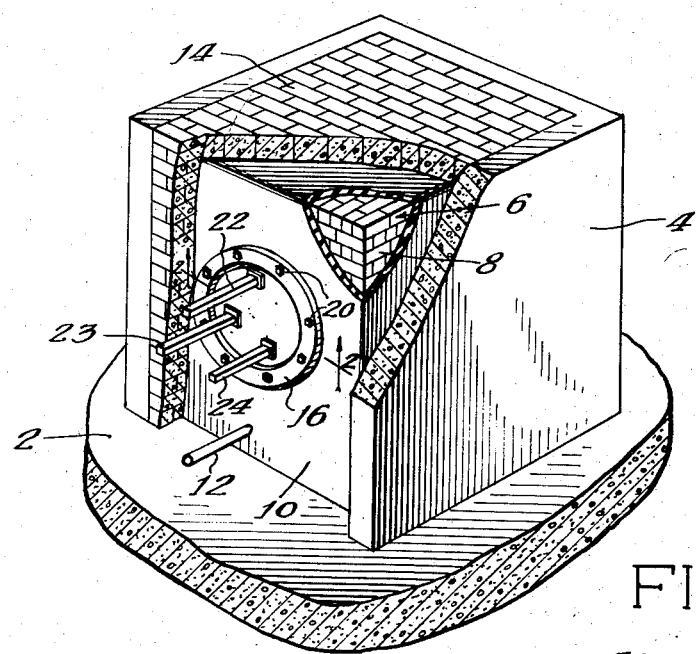
FIG.2.
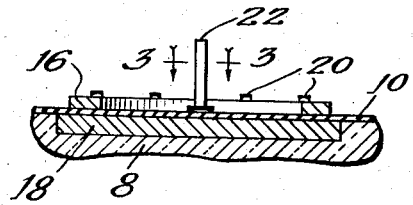
FIG.3.
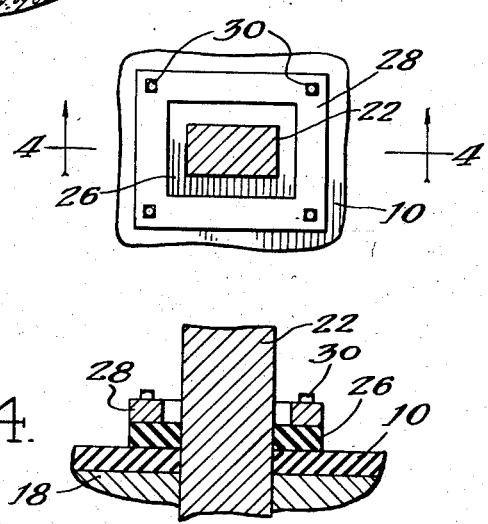
FIG.4.
Witnesses:
Herbert E. Metcalf
Walter L. Schlegel, Jr.
Inventors
Enrico Fermi
Walter H. Zinn
By: Herbert L. Anderson
Attorney

[2,852,461]
Patented Sept. 16, 1958

2,852,461
NEUTRONIC REACTOR

Enrico Fermi, Santa Fe, N. Mex., Walter H. Zinn, Chicago, Ill., and Herbert L. Anderson, Hartford, Conn., assignors to the United States of America as represented by the United States Atomic Energy Commission Application October 11, 1945, Serial No. 621,837

1 Claim. (Cl. 204—193.2)

This invention relates to the general subject of nuclear fission, and more particularly to a novel means for improving the establishment of self-sustaining nuclear fission chain reactions.

In order to attain a self-sustaining chain reaction in a system of practical size, the ratio of the number of neutrons produced in one generation by the fissions, to the original number of neutrons initiating the fissions, must be known to be greater than unity after all neutron losses are deducted, and this ratio is, of course, dependent upon the values of the pertinent constants.

In a self-sustaining chain reaction of uranium with slow neutrons, as presently understood, $92^{238}$ is converted by neutron capture to the isotope $92^{239}$. The latter is converted by beta decay to $93^{239}$ and this $93^{239}$ in turn is converted by beta decay to $94^{239}$. Other isotopes of 93 and 94 may be formed in small quantities. By slow or thermal neutron capture, $92^{235}$ on the other hand, can undergo nuclear fission to release energy appearing as heat, gamma and beta radiation, together with the formation of fission fragments appearing as radioactive isotopes of elements of lower mass numbers, and with the release of secondary neutrons.

The secondary neutrons thus produced by the fissioning of the $92^{235}$ nuclei have a high average energy, and must be slowed down to thermal energies in order to be in condition to cause slow neutron fission in other $92^{235}$ nuclei. This slowing down, or moderation of the neutron energy, is accomplished by passing the neutrons through a material where the neutrons are slowed by collision. Such a material is known as a moderator. While some of the secondary neutrons are absorbed by the uranium isotope $92^{238}$ leading to the production of element 94, and by other materials such as the moderator, enough neutrons can remain to sustain the chain reaction when proper conditions are maintained.

Under these proper conditions, the chain reaction will supply not only the neutrons necessary for maintaining the neutronic reaction, but also will supply the neutrons for capture by the isotope $92^{238}$ leading to the production of 94, and excess neutrons for use as desired.

As 94 is a transuranic element, it can be separated from the unconverted uranium by chemical methods, and as it is fissionable by slow neutrons in a manner similar to the isotope $92^{235}$, it is valuable, for example, for enriching natural uranium for use in other chain reacting systems of smaller overall size. The fission fragments are also valuable as sources of radioactivity.

The ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials.

Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size therefore, differs from K by the external leakage factor, and by a factor due to the neutron absorption by localized neutron absorbers; and the reproduction ratio must still be greater than unity to permit the neutron density to rise exponentially with time in the system as built.

More specific details of the theory and of the essential characteristics of neutronic reactors and neutronic reactor systems are set forth in the copending application of Enrico Fermi and Leo Szilard, Serial No. 568,904, filed December 19, 1944, now Patent No. 2,708,656, dated May 17, 1955.

During the interchange of neutrons in a system of finite size, comprising bodies of any size disposed in a neutron moderator, neutrons may be lost to the chain reaction in four ways:

(1) By absorption or capture in the uranium content of the bodies without producing fission;

(2) By absorption or capture in the moderator material itself;

(3) By absorption or capture by the impurities present in both the uranium bodies and the moderator;

(4) By leakage out of the system through the periphery thereof.

The present invention is directed to a novel means and method for increasing the reproduction ratio of a finite system by diminishing the neutron loss due to the third factor above listed, namely, impurities within the reactor.

The effect of impurities on the optimum reproduction factor K may be conveniently evaluated by means of certain constants known as "danger coefficients" which are assigned to the various elements. These danger coefficients for the impurities are each multiplied by the percent by weight of the corresponding impurity, with respect to the weight of uranium in the system, and the total sum of these coefficients gives a value known as the total danger sum. This total danger sum is subtracted from the reproduction constant K as calculated for theoretically pure materials and for the specific geometry under consideration.

The danger coefficients are defined in terms of the ratio of the weight of impurity per unit mass of uranium and are based on the cross section for absorption of neutrons of the various elements. These values may be obtained from published literature on the subject, and by direct measurement, and the danger coefficient computed by the formula $$\frac{Ti}{Tu} \cdot \frac{Au}{Ai}$$

wherein $Ti$ and $Tu$ represent the cross sections for the impurity and the uranium respectively, $Ai$ the atomic weight of the impurity and $Au$ the atomic weight for uranium. In general, whether the impurities are in the moderator or in the uranium, they may be computed as their fraction by weight, of the uranium in the system, and the result will be sufficiently accurate for design purposes.

Danger coefficients for some elements are given in the following table, wherein the elements are listed in order of their atomic number:

| Element | Danger Coefficient | Element | Danger Coefficient |
|---|---|---|---|
| Li | 310 | Ni | 3 |
| B | 2150 | Cu | 1.8 |
| C | 0.012 | Zn | 0.61 |
| N | 4 | Ga | ~1 |
| O | 0.002 | As | 2 |
| F | 0.02 | Se | 6.3 |
| Na | 0.65 | Br | 2.5 |
| Mg | 0.48 | Rh | 50 |
| Al | 0.30 | Ag | 18 |
| Si | 0.26 | Cd | 870 |
| P | 0.3 | In | 54.2 |
| S | 0.46 | Sn | 0.18 |
| Cl | 31 | Sb | 1.6 |
| K | 2.1 | I | 1.6 |
| Ca | 0.37 | Ba | 0.30 |
| Ti | 3.8 | Sm | ~1430 |
| V | 4 | Eu | 435 |
| Cr | 2 | Gd | ~6320 |
| Mn | 7.5 | Pb | 0.03 |
| Fe | 1.5 | Bi | 0.0025 |
| Co | 17 | Th | 1.1 |

The sum of the danger coefficients of the impurities in any given composition entering into a reactor as multiplied by the fraction by weight of the uranium in the reactor, is known as total danger sum of the composition. This figure is a dimensionless constant like K and accordingly can be directly subtracted from K. The danger coefficients given are related to a neutron absorption value of unity for uranium.

As a specific example of the use of danger coefficients, if the materials of a system under consideration have 0.01 percent by weight of each of the elements Co, Ag and N with respect to the weight of the uranium in the system, then the total danger sum in K units for such an analysis would be:

$$.0001 \times 17 + .0001 \times 18 + .0001 \times 4 = .0039$$

This figure can then be subtracted from the K calculation for a particular geometry of theoretically pure materials to give the actual K constant for the materials used.

Therefore, a principal object of the present invention is to reduce the total danger sum of the impurities in a neutronic reactor by the novel method of and means for eliminating atmospheric air therefrom, thereby eliminating a substantial quantity of nitrogen which comprises more than 70 percent of the atmospheric air. It may be noted in the above table that nitrogen has a danger coefficient of 4.0, and it will, therefore, be readily understood that by eliminating atmospheric air from a reactor, the K thereof will be substantially increased.

Another object is to provide a novel method and means of varying the reproduction ratio of a neutronic reactor by varying the air content of the reactor.

Other objects and advantages will be apparent from the following description taken in conjunction with the accompanying drawing, in which:

Fig. 1 is a perspective view of a reactor incorporating a preferred embodiment of the present invention, parts being broken away and parts being shown in section for clarity;

Fig. 2 is an enlarged section partly in elevation, on the line 2—2 of Fig. 1, taken as indicated;

Fig. 3 is an enlarged section partly in elevation, on the line 3—3 of Fig. 2, taken as indicated; and Fig. 4 is a section on the line 4—4 of Fig. 3.

Describing the invention in detail, and referring first to Fig. 1, on a concrete foundation 2 is provided an upstanding, concrete vault or shield 4 receiving therewithin a neutronic reactor or pile, generally designated 6, said reactor 6 being per se no part of the present invention, and being fully described and claimed in copending application, Serial No. 568,904, filed December 19, 1944, now Patent No. 2,708,656, dated May 17, 1955, in the joint names of Enrico Fermi and Leo Szilard. The reactor 6 shown is constructed as a lattice of uranium-containing slugs or lumps in a moderating material, such as graphite, formed as blocks. Around the moderator is a reflector 8 formed of graphite blocks, or the like.

A fluid-tight casing or envelope 10 is disposed around the four sides, top, and bottom of the reflector 8 so that the entire reactor 6 is contained within the casing 10, which is preferably formed of balloon cloth but may be constructed of any other suitable material, such as steel. In this connection, it may be noted that the casing 10 is preferably formed of material which is substantially neutron pervious or, in other words, material having a negligible neutron absorption, inasmuch as a neutron absorbent material, after operation of the pile, would become highly radioactive, thereby constituting a serious hazard to operating personnel. The casing 10 may enclose the vault 4 and be anchored to the foundation 2 if preferable. A suitable valve 12 is provided for evacuation of the casing 10.

The casing 10 is clamped between a clamping ring 16 and a plate 18 (Fig. 2) by means of stud bolts 20, which extend through the plate 18 and into the reflector 8. The plate 18 is inset into the reflector 8 to provide an even surface for the casing 10. Three rods 22, 23 and 24 of neutron absorbent material, preferably cadmium, extend into slots within the reactor 6 through openings in the plate 18 and the casing 10, each of said openings being sealed by a gland 26 (Figs. 3 and 4) clamped to the plate 18 by a rectangular frame 28, which is secured to the plate 18 by stud bolts. A Wilson seal, which is well-known in the art, may be employed instead of the seal just described.

The rods 23 and 24 may function as safety rods and are connected to suitable actuating means (not shown) for urging them to their innermost positions within the reactor 6, thereby reducing the reproduction ratio thereof to a value below unity, whenever the reactor attains a temperature of predetermined maximum value as the result of the neutron density within the reactor. The rod 22 may function as a control rod connected to a suitable actuating means (not shown) for moving said rod 22 inwardly and outwardly of the reactor 6, thereby controlling the reproduction ratio thereof for the purpose of regulating the neutron density within the reactor 6. Hence, the rods 22, 23, and 24 must be able to be moved into and out of the reactor 6. Concrete blocks 14 are placed against the open wall and on top of the reactor 6. The valve 12 includes a stem of sufficient length to extend through the blocks 14. Those blocks 14 covering the ring 16 are recessed to receive the ring 16 and studs 20.

In constructing the above-described system embodying the present invention, the blocks of the reactor 6 including those of the reflector 8 are piled or stacked within the vault 4 on the casing 10. Certain of the blocks are, of course, slotted to provide horizontal passages through the reactor 6 for the reception of the rods 22, 23, and 24. During construction of the reactor 6 within the casing 10, the rods 22, 23, and 24 are inserted through provided slots in the casing 10 and into the respective slots in the reactor 6 as soon as that part of the reactor 6 containing the rod slots is completed. Each rod seal is completed so that the rods may be used as controls in the remaining construction of the reactor 6.

After the reactor 6 is completed, the casing 10 is sewed or otherwise sealed. The concrete blocks 14 are placed as shown, completing the vault 4. The casing 10 is evacuated through the valve 12, thereby reducing the impurities in the reactor 6, and improving the reproduction ratio thereof. Manifestly, the reproduction ratio of the reactor 6 may be varied by the present invention within the two extremes of an evacuated state and of a state of air saturation. Thus, the present invention is a delicate control within such limits.

It is to be noted that a simple form of reactor 6 is illustrated and described in this application. However, it will be readily understood by any one skilled in the art that the present invention can be utilized with other types of reactors.

It will be understood that, if desired, the reactor 6 may be built up to a point at which the reproduction ratio thereof is equivalent to unity or a value slightly lower than unity, with the control and safety rods withdrawn to their outermost positions, provided that the substantial removal of atmosphere from the reactor 6 is sufficient to raise said ratio to a value greater than unity. Then, by evacuating the casing 10 an operative system may be obtained. However, such a practice is generally impractical because of the close tolerances involved, and in most cases it is preferable to build the reactor 6 to a size at which its reproduction ratio is greater than unity, with the control rods removed, even though the chamber is not evacuated. By atmospheric air is meant the usual atmospheric gases containing oxygen, nitrogen, and commonly a small amount of argon.

The enormous forces brought into play by the evacuation of a large neutronic reactor system or pile present problems of design resulting in involved structural forms. Furthermore, it is difficult to make gas tight. It is better to displace the air by a non-reactive gas, that is non-reactive from both a chemical and nuclear standpoint. Suitable gases are helium and carbon dioxide. This also has the advantage of increasing K of the pile.

Other advantages of this invention include the removal from the reactor of argon which, if it remains, becomes radioactive, diffuses out of the reactor, and thus constitutes a health hazard to the operators. In addition, the removal of the oxygen in the air prevents oxidation of component parts of the reactor such as the uranium or container for the uranium.

While the theory of the nuclear chain fission reaction set forth herein is based on the best presently known experimental evidence, the present invention is not limited thereto, except by the scope of the claims, inasmuch as additional experimental data later discovered may modify the theory disclosed and other means and methods for practicing this invention within the scope of the claims may be later developed by those skilled in the art.

What is claimed is:

A neutron chain reacting device comprising a rectangular shaped neutronic reactor containing uranium disposed within a graphite block moderator and surrounded by a graphite block reflector, said reactor having a plurality of parallel adjacent slots extending therein from one surface thereof, a fluid-tight casing disposed about the reactor having an aperture therein confronting each slot in the reactor, a flat recess in the reactor confronting the apertures in the casing, a plate disposed in the recess abutting the reactor and the casing, the plate having orifices therein aligned with the slots and apertures, a retaining ring disposed about the slots on the side of the casing opposite the plate and secured to the reactor to support the casing, a neutron absorbing control rod slidably disposed in each slot of the reactor and extending outwardly therefrom through the confronting orifice in the plate and aperture in the casing, a gland having an opening disposed about each control rod in contact with the surface of the casing opposite the plate, a frame disposed about each control rod in contact with the surface of the gland opposite the casing, a plurality of stud bolts extending through each frame and gland and anchored in the plate, and means for removing atmospheric air from the reactor.

References Cited in the file of this patent

UNITED STATES PATENTS

| | | |
|---|---|---|
| Re. 21,781 | Toulmin | Apr. 22, 1941 |
| 1,306,568 | Weintraub | June 10, 1919 |
| 2,127,193 | Toulmin | Aug. 16, 1938 |
| 2,205,854 | Kroll | June 25, 1940 |
| 2,708,656 | Fermi et al. | May 17, 1955 |

FOREIGN PATENTS

| | | |
|---|---|---|
| 114,150 | Australia | May 2, 1940 |
| 114,151 | Australia | May 3, 1940 |
| 233,011 | Switzerland | Oct. 2, 1944 |
| 861,390 | France | Oct. 28, 1940 |

OTHER REFERENCES

Smyth: "Atomic Energy for Military Purposes," pp. 177–181, 70, 82–87, August 1945. Copy may be purchased from Supt. of Documents, Washington 25, D. C.

The Merriam-Webster Pocket Dictionary, p. 123, Pocket Books, Inc., N. Y. (1947).